United States Patent [19]

Reid

[11] Patent Number: 4,674,711

[45] Date of Patent: Jun. 23, 1987

[54] PORTABLE AIRCRAFT ARRESTING APPARATUS

[75] Inventor: Paul D. Reid, Springfield, Pa.

[73] Assignee: Gulf & Western Manufacturing Company, Southfield, Mich.

[21] Appl. No.: 673,607

[22] Filed: Nov. 21, 1984

[51] Int. Cl.⁴ .............................................. B64F 1/02
[52] U.S. Cl. ................................................ 244/110 C
[58] Field of Search ............ 244/110 C, 110 A, 110 F

[56] References Cited

U.S. PATENT DOCUMENTS

| | | | |
|---|---|---|---|
| 2,814,365 | 11/1957 | Snow | 188/151 |
| 2,969,944 | 12/1985 | Knecht | 244/110 A |
| 3,172,625 | 3/1965 | Doolittle | 244/110 |
| 3,259,213 | 7/1966 | Daniels et al. | 188/86 |
| 3,309,043 | 3/1967 | Strance et al. | 244/110 |
| 3,414,333 | 12/1968 | Merle | 303/21 |

OTHER PUBLICATIONS

"Portarrest" Mobile Aircraft Arresting System" by Gulf & Western Co., reprinted from Air Force Magazine May 1981, Almanac ed. and Sep. 1981 issue.

Primary Examiner—Galen Barefoot
Assistant Examiner—Lynn M. Fiorito
Attorney, Agent, or Firm—Body, Vickers & Daniels

[57] ABSTRACT

Portable aircraft arresting apparatus is disclosed which is comprised of a towable wheeled trailer providing a frame adapted to be anchored along a runway or landing strip and which is adapted to selectively support two different energy absorbing units, one of which includes a tape reel rotatable about a horizontal axis and the other of which includes a tape reel rotatable about a vertical axis. At least partially different tape patterns and paths are required with respect to the tapes on the two reels, and the frame carries sheave components which provide the required tape patterns and paths for the tapes on the two reels. In accordance with another aspect of the invention, the sheave components provide selectable tape issue paths, one of which opens laterally of the frame and the other of which opens longitudinally of the frame, thus providing selectivity with respect to positioning of the apparatus relative to a runway.

26 Claims, 10 Drawing Figures

PORTABLE AIRCRAFT ARRESTING APPARATUS

BACKGROUND OF THE INVENTION

This invention relates to the art of aircraft arresting systems and apparatus and, more particularly, to improved portable aircraft arresting apparatus.

Portable aircraft arresting equipment has been provided heretofore comprising a towable wheeled trailer carrying an energy absorber or brake unit and other equipment necessary to provide a self-contained unit for use in aircraft arresting systems. Such portable equipment selectively operable to provide a cable-type or a net-type arresting system is disclosed in co-pending U.S. patent application Ser. No. 581,807 filed Feb. 21, 1984 and assigned to the same assignee as the present application. The energy absorber or brake unit in such prior portable equipment has been comprised of a tape reel rotatable about a horizontal axis transverse to the opposite ends of the apparatus. The reel carries a tape having a free end extending laterally of the apparatus for attachment to a pendant or cable in connection with a cable-type arresting system or with the lower net strap of a stanchion supported net in connection with a net-type arresting system. In connection with the use of such portable systems, two of the towable units are positioned on opposite sides of an air strip with the tape ends of the two units aligned transversely of the runway, and the cable or lower net strip is attached to the ends of the tapes. Each trailer is ground supported with the trailer wheels elevated out of contact with ground, and the trailer is appropriately secured or anchored to the ground or to concrete anchors.

While such prior portable apparatus functions entirely satisfactorily with respect to arresting landing aircraft, there are limitations attendant to the structure and operation thereof which have rendered them unacceptable or incapable of use in certain situations. For example in this respect, the tape issue path in such previous units as mentioned above has been laterally outwardly of the frame or platform, whereby a considerable length of ground or other supporting surface is required along and parallel to the runway to accommodate the apparatus. While such deployment of the apparatus is desirable from the standpoint of minimizing use of runway width or of the ground surface adjacent to the runway, damage of the runway or the ground adjacent thereto can preclude such installation, or at least require extensive preliminary work which accordingly increases installation time and thus defeats one of the primary purposes for using portable equipment. In connection with the length of runway required to achieve aircraft arresting, damage to the runway or the ground adjacent thereto can make it extremely difficult to find a sufficient length of runway or ground on opposite sides of the landing path for the necessary longitudinal installation of the apparatus.

Another disadvantage resides in the fact that portable units heretofore were limited to the use of an energy absorber or brake unit in which the tape reel was rotatable about a horizontal axis transverse to the opposite ends of the trailer or frame. Thus, versatility and selectivity with respect to the brake unit was limited by the inability to employ energy absorber or brake units in which the tape reel was rotatable about a vertical axis. Such reel axis disposition provides a different tape orientation relative to the frame of the apparatus than that for the tape of a reel rotatable about a horizontal axis, and previous attempts to accommodate a brake unit having a tape reel rotatable about a vertical axis have resulted in detrimental dynamics in the arresting system during an arrestment operation.

SUMMARY OF THE INVENTION

In accordance with one aspect of the present invention, portable aircraft arresting apparatus is provided with selectable tape issue passageways respectively opening laterally and longitudinally of the apparatus, whereby versatility and selectivity is provided in connection with positioning units on opposite sides of a runway. More particularly in this respect, the units can be positioned with the longitudinal axes thereof parallel to the runway when surface conditions permit and minimum use of runway width or the width of the ground adjacent to the runway is desired. Alternatively, the units can be positioned with the longitudinal axes thereof perpendicular to the runway, whereby the units are adaptable to damaged or otherwise irregular runway or ground conditions which might otherwise prohibit installation of the units.

In accordance with another aspect of the invention, the apparatus frame is structured to selectively and removably support energy absorber or brake units having tape reels rotatable about a horizontal axis or about a vertical axis, thus adding versatility and selectivity with respect to the type of brake unit to be used in connection with a given situation. More particularly with regard to this aspect of the invention, the apparatus frame supports tape sheaves which provide a corresponding tape path for each of the tapes of the two differently oriented tape reels. Still further in this respect, the two tape paths are preferably achieved in part through a sheave unit which is selectively mountable on the frame of the apparatus in two different orientations and which, in each of the mounted orientations, provides a portion of the tape path for one of the two tapes. Advantageously, in accordance with a preferred embodiment, all that is necessary to convert from one energy absorber or brake unit to the other is to remove the one unit, mount the other unit, reorient the multiple sheave unit, and thread the tape from the reel to the tape issue passageway. The paths of the two tapes have a common tape issue passageway relative to the apparatus frame, thus enabling conversion between two different energy absorber units without disturbing the positioning of previously installed apparatus. Preferably, the tape issue passageway for each of the two tapes is selectable as mentioned hereinabove, thus enabling selective positioning of the apparatus relative to the runway together with selectivity in connection with the energy absorber or brake unit employed.

It is accordingly an outstanding object of the present invention to provide improved portable aircraft arresting apparatus which is selectively positionable with the longitudinal axis thereof either parallel or perpendicular to a runway.

Another object is the provision of improved portable aircraft arresting apparatus which will accommodate energy absorbing units including tape reels rotatable either about a horizontal axis or about a vertical axis and which provides corresponding tape paths for the tapes of each of the reels.

Another object is the provision of portable aircraft arresting apparatus including a frame for selectively and removably supporting energy absorber units having tape reels rotatable about a horizontal axis or about a vertical axis, together with an arrangement of tape sheaves providing corresponding tape paths between each reel and a common tape issue passageway.

Still another object is the provision of portable aircraft arresting apparatus which is both selectively positionable relative to a runway and selectively operable with energy absorber or brake units having differently oriented axes of rotation relative to the apparatus.

BRIEF DESCRIPTION OF THE DRAWINGS

The foregoing objects, and others, will in part be obvious and in part pointed out more fully hereinafter in conjunction with the written description of a preferred embodiment illustrated in the accompanying drawings in which.

DESCRIPTION OF PREFERRED EMBODIMENTS

Figure 1:
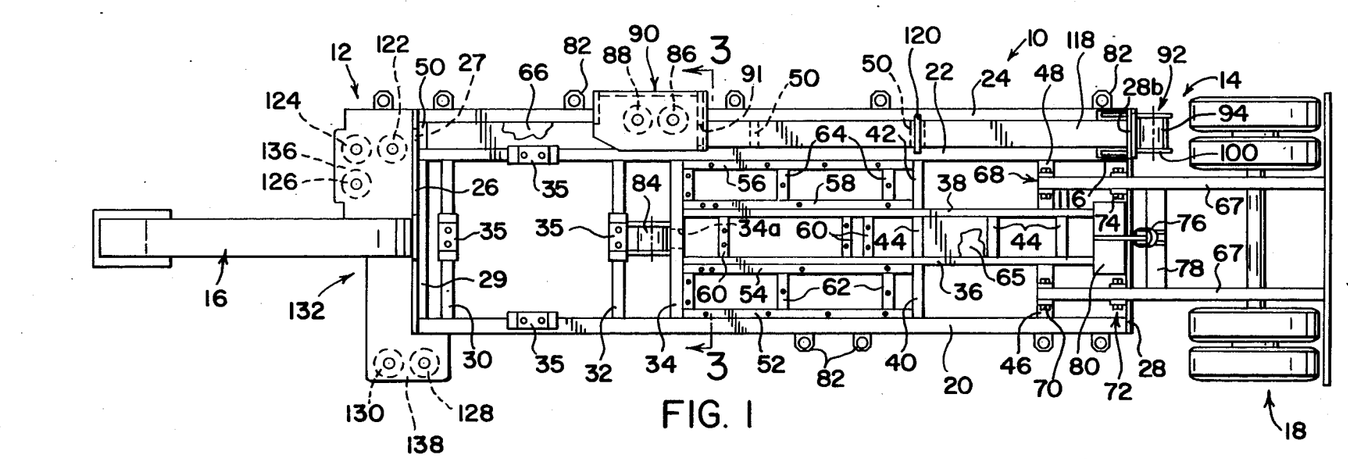
FIG. 1 is a plan view of a frame construction for portable aircraft arresting apparatus according to the present invention.
Figure 2:
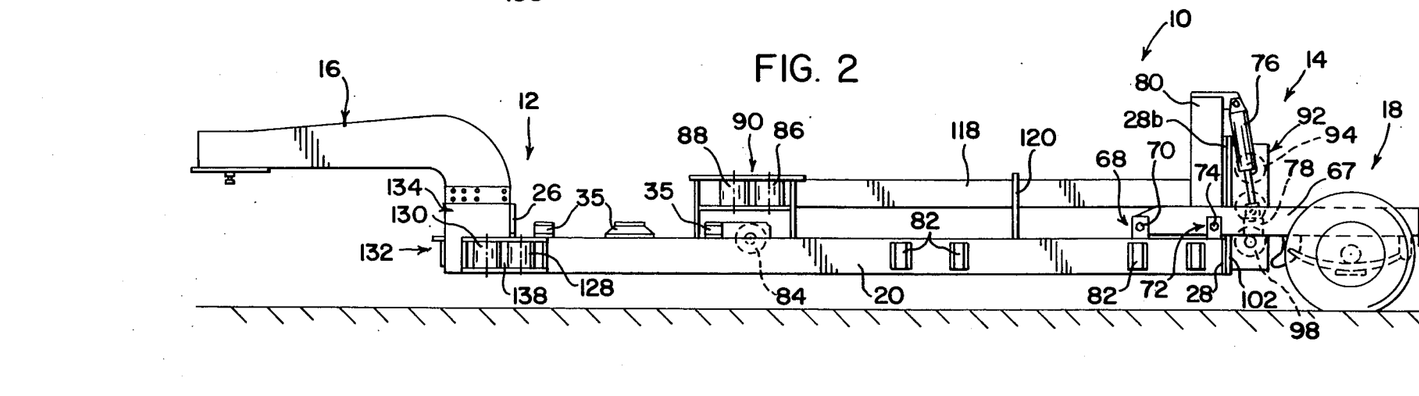
FIG. 2 is a side elevation view of the frame construction shown in FIG. 1.
Figure 3:
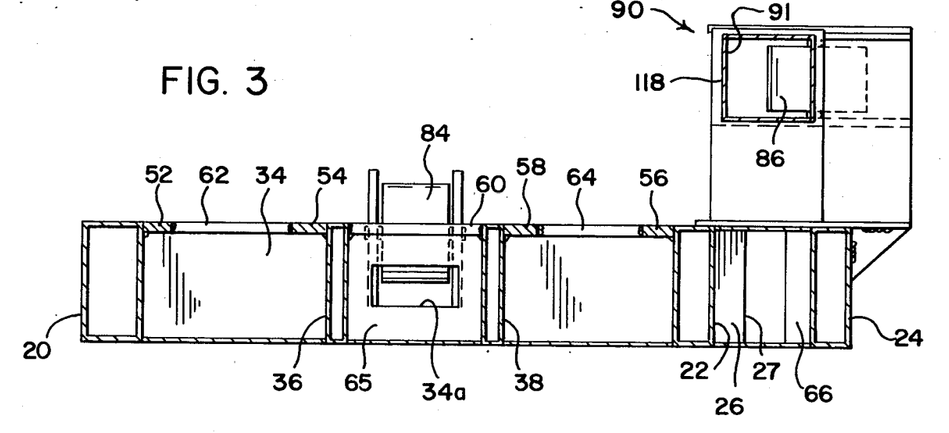
FIG. 3 is a cross-sectional elevation view taken along line 3—3 in FIG. 1.
Figure 4:
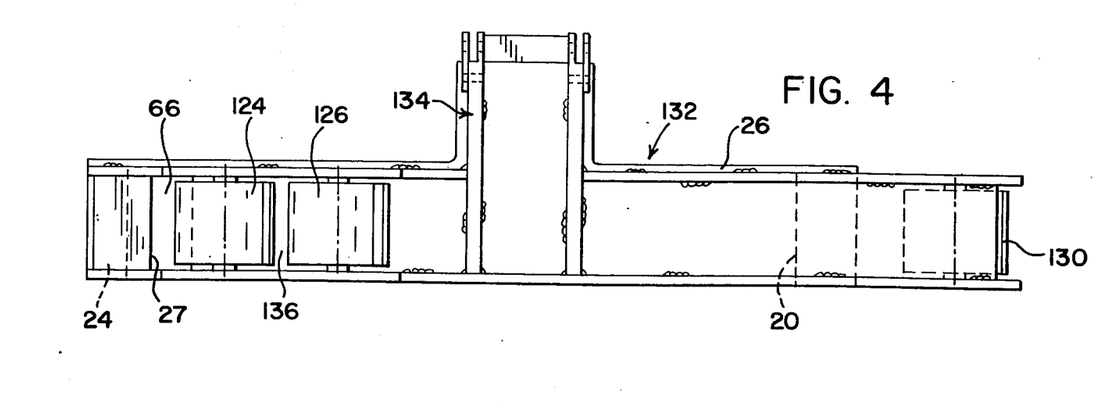
FIG. 4 is a front elevation view of the frame construction with the tow connection removed and looking in the direction from left to right in FIGS. 1 and 2.

Referring now in greater detail to the drawings, wherein the showings are for the purpose of illustrating preferred embodiments of the invention only, and not for the purpose of limiting the invention, FIGS. 1-5 illustrate a towable, wheeled frame unit 10 for portable aircraft arresting apparatus according to the present invention. The towable frame 10 has front and rear ends 12 and 14, respectively, and is provided at front end 12 with a removable goose neck or tow connection 16 and at its rear end 14 with a selectively positionable dual wheel assembly 18. With the component parts positioned as shown in FIGS. 1 and 2, it will be appreciated that the frame construction is towable by connecting goose neck 16 to a suitable tractor or other towing vehicle.

The frame construction between ends 12 and 14 include longitudinally extending side frame members 20, 22 and 24 which, preferably, are tubular in cross-section, and vertically extending cross plate members 26 and 28 respectively at the front and rear ends of the side frame members. A plate member 29 extends laterally between side members 20 and 22 adjacent cross plate 26, and tubular cross members 30, 32 and 34 extend between side members 20 and 22 in spaced apart relationship with respect to the direction from front end 12 towards rear end 14. For the purposes set forth hereinafter, side members 20 and 22 and cross members 30 and 32 are provided with mounting block assemblies 35, and cross member 34 is provided with a tape slot 34a opening centrally therethrough. Longitudinally extending tubular frame members 36 and 38 extend from cross frame member 34 to rear frame plate 28 intermediate side members 20 and 22. Cross frame members 40 and 42 laterally interconnect the top ends of frame members 20 and 36 and frame members 22 and 38, respectively, and cross frame members 44 laterally interconnect the top ends of frame members 36 and 38 rearwardly from a location in alignment with cross members 40 and 42. Tubular cross frame members 46 and 48 laterally interconnect frame members 20 and 36 and frame members 22 and 38, respectively, and provide supports for wheel unit 18 as described in greater detail hereinafter. The top ends of side frame members 22 and 24 are laterally interconnected by means of a number of cross frame members 50 therebetween. The frame construction further includes longitudinally extending equipment mounting plates 52 and 54 projecting laterally toward one another from the upper ends of members 20 and 36, respectively, and similar mounting plates 56 and 58 extend laterally toward one another from the upper ends of frame members 22 and 38, respectively. Finally, with respect to this portion of the frame construction, mounting plates 60 extend laterally between the upper ends of frame members 36 and 38, mounting plates 62 extend between plate members 52 and 54, and mounting plates 64 extend laterally between mounting plates 56 and 58. These equipment mounting plates are provided with threaded apertures, not designated numerically, to facilitate the removable mounting of various pieces of equipment on the frame. For the purpose set forth hereinafter, and as will be apparent from the portions of frame 10 shown in FIGS. 3 and 5, the top and bottom ends of frame members 36 and 38 are closed by sheet metal cover panels therebetween, not designated numerically, to provide an open ended tubular tape passageway 65 which is laterally centrally of frame 10 and extends between cross frame member 34 and rear frame plate member 28. Similarly, the top and bottom ends of frame members 22 and 24 are closed by sheet metal cover panels to provide an open ended tubular tape passageway 66 which extends along the side of frame 10 between rear frame plate member 28 and front frame plate member 26.

Dual wheel unit 18 is pivotally mounted on rear end 14 of the frame to facilitate transport of the apparatus when the wheel unit is positioned as shown in FIGS. 1 and 2, and to facilitate lowering of the frame for ground support during use of the arresting gear apparatus. More particularly in this respect, wheel unit 18 includes a pair of support arms 67 having inner ends pivotally interconnected with cross members 46 and 48 of the frame by means of corresponding mounting brackets 68 and nut and bolt assemblies 70. A latching bracket 72 is provided on cross plate member 28 of the frame for each support arm 67, and nut and bolt assemblies 74 releaseably interengage support arms 67 and latching brackets 72. It will be appreciated that the removal of the nut and bolt assemblies 74 releases support arms 67 for pivotal displacement to facilitate lowering of the frame unit into engagement with the ground therebeneath. Pivotal displacement of the wheel assembly in this respect is achieved by means of a hydraulic piston and cylinder unit 76 having one end attached to cross member 78 between arms 67 and the other end attached to a supporting structure 80 mounted at end 14 of the frame between frame members 36 and 38. The frame is provided at spaced apart points thereabout with anchor brackets 82 which facilitate anchoring of the frame assembly in place during use of the apparatus.

The frame further includes a plurality of sheaves mounted thereon to provide guide components defining two tape paths for the reel supported tapes of energy absorbing units mountable on the frame as set forth more fully hereinafter. The sheaves include a first sheave 84 mounted generally centrally between side frame members 20 and 22 and between cross frame members 32 and 34 for rotation about a horizontal axis transverse to the direction between the opposite ends of the frame. A pair of laterally outer sheaves 86 and 88 are supported in a corresponding sheave housing 90 for rotation about vertical axes, and housing 90 is mounted on frame members 22 and 24 so as to support sheaves 86 and 88 in an area spaced above the top surfaces of frame members 22 and 24. The sheave arrangement further includes a rear sheave unit 92 which is removably mounted on cross plate member 28 and, as will become apparent hereinafter, is selectively mountable on the latter frame plate in the vertical disposition shown in FIGS. 1 and 2 and in a horizontal disposition in which the sheave unit extends laterally of plate 28.

Figure 5:
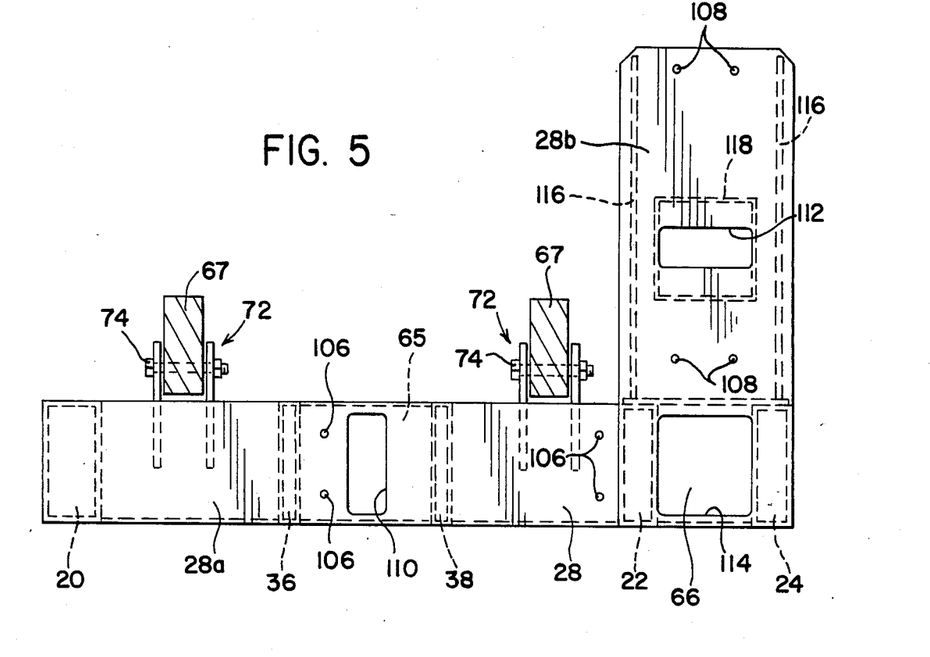
FIG. 5 is a rear elevation view of the frame construction looking in the direction from right to left in FIGS. 1 and 2 and showing the rear sheave unit and trailer wheels removed.
Figure 6:
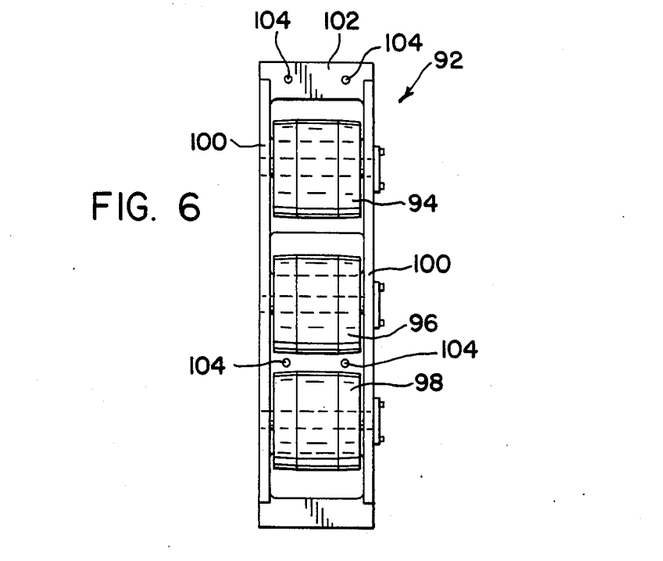
FIG. 6 is an elevation view of the rear sheave unit looking in the direction from right to left in FIGS. 1 and 2.

As best seen in FIGS. 5 and 6 of the drawing, sheave unit 92 includes sheaves 94, 96 and 98 rotatably mounted between support plates 100 which are welded or otherwise secured to a mounting plate 102 having openings 104 therein. As best seen in FIG. 5, cross plate 28 includes a laterally extending portion 28a and a vertically extending portion 28b adjacent the side of the frame assembly defined by side frame members 22 and 24. Laterally extending portion 28a of the frame plate is provided with mounting openings 106 alignable with openings 104 through mounting plate 102 of sheave unit 92, and vertical portion 28b of the frame plate is likewise provided with mounting openings 108 alignable with openings 104. Accordingly, it will be appreciated that sheave unit 92 is adapted to be selectively mounted on horizontal portion 28a or vertical portion 28b of frame plate 28 and, as will be described hereinafter, such selective mounting provides for pairs of the sheaves 94, 96 and 98 to define a portion of each of the two tape paths. For the purpose which will become apparant hereinafter, frame plate 28 is provided with a tape slot 110 in portion 28a and aligned with tape passageway 65, a tape slot 112 in portion 28b, and a tape slot 114 in the corner therebetween and aligned with tape passageway 66. Frame plate portion 28b is preferably reinforced in the direction toward the front of the frame unit by support plates 116, and an upper tape path housing 118 has one of its opposite ends secured to frame plate portion 28b in alignment with tape slot 112. The other end of housing 118 is secured to housing 90 for sheaves 86 and 88 and in alignment with a tape slot 91 provided in the latter housing. Housing 118 is supported intermediate its opposite ends by means of a support plate 120 secured thereto and to frame members 22 and 24 therebeneath.

The sheave arrangement further includes a front sheave unit comprising first and second sets of sheaves respectively defined by sheaves 122, 124 and 126 and sheaves 128 and 130. As will be appreciated from FIGS. 1, 2 and 4 of the drawing, the front sheave unit includes a housing 132 of plate construction mounted forwardly of side frame members 20, 22 and 24 by means of vertical cross frame plate 26. The front sheave housing includes an upwardly extending portion 134 to which goose neck 16 is removably mounted for the purposes set forth hereinafter. Frame plate 26 is provided with a tape slot 27 aligned with tape passageway 66, and the portion of housing 132 forwardly of sheave members 124 and 126 is provided with a tape slot 136 providing a tape issue passageway opening longitudinally forwardly of the frame structure. The part of housing 132 laterally outwardly adjacent sheave members 128 and 130 is provided with a tape slot 138 providing a tape issue passageway opening laterally outwardly of the frame at the same end thereof and from the laterally opposite side relative to tape slot 136.

Figure 7:
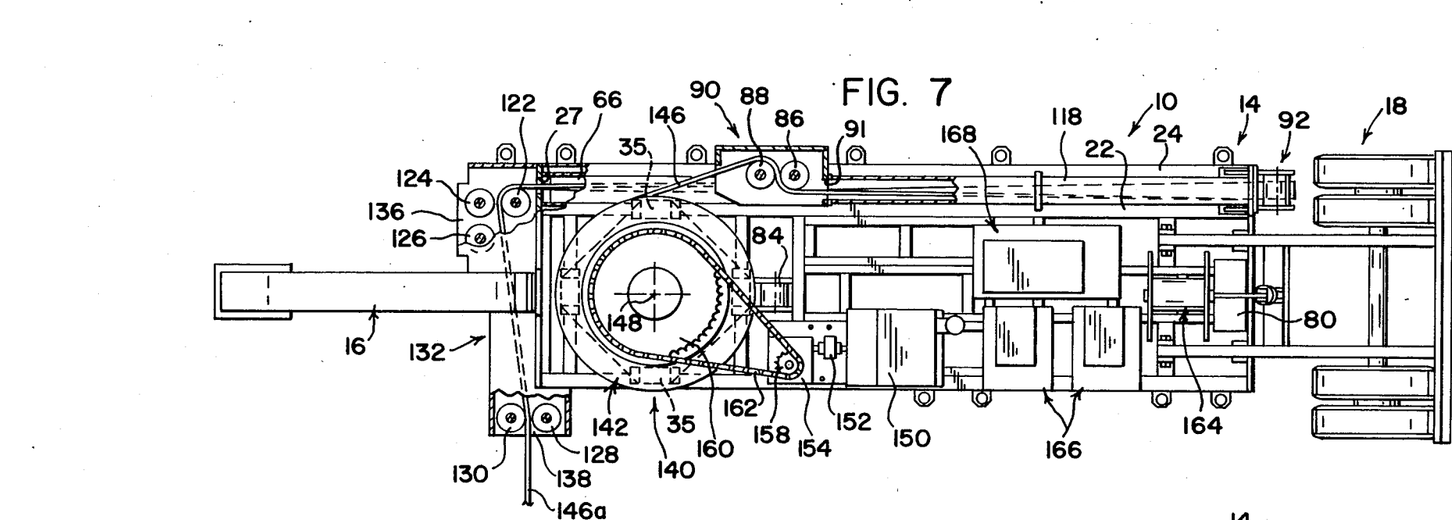
FIGS. 7 and 8 are plan and side elevation views, respectively, of portable arresting apparatus according to the present invention and showing the mounting disposition and tape path for an energy absorber having a tape reel rotatable about a vertical axis; and, FIGS. 9 and 10 are plan and side elevation views, respectively, of portable arresting apparatus according to the present invention and showing the mounting disposition and tape path for an energy absorber having a tape reel rotatable about a horizontal axis.
Figure 8:
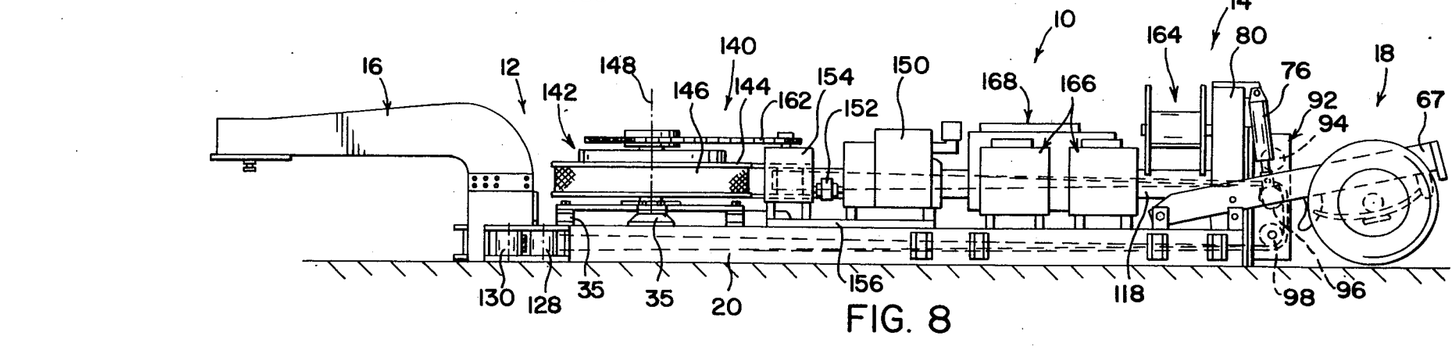

In accordance with the present invention, the frame construction including the sheave arrangement provides for the selective use of energy absorber or brake units having tape reels rotatable about horizontal or vertical axes, whereby the orientation of the tapes and the reels relative to the frame are different. Such different orientations necessitate at least partially different tape paths between the tape reel and the tape issue passageway from which the free end of the tape extends for attachment to a cable in a cable-type arresting system or to the lower net strap in a net-type arresting system. The accommodation of such different energy absorber units by the frame construction described hereinabove is illustrated in FIGS. 7 and 8 with respect to an energy absorber unit having a tape reel rotatable about a vertical axis and in FIGS. 9 and 10 with respect to an energy absorbing unit having a tape reel rotatable about a horizontal axis. With reference first to FIGS. 7 and 8, a water turbine-type energy absorber unit 140 is somewhat schematically illustrated as being mounted on frame 10 by way of the mounting blocks 35. Water turbine energy absorbers are well known in the art and the structure and operation thereof do not form a part of the present invention, whereby a detailed description thereof is not necessary. It will be sufficient for purposes of the present invention to understand that the unit includes a tape reel and turbine assembly 142 including a tape reel 144 for tape 146 and which reel is rotatable about a vertical axis 148. Tape 146 is stored on reel 144, is unwound therefrom during an aircraft arresting operation, and is rewound thereon by operation of a drive unit comprised of a rewind engine 150, a clutch unit 152 and a gear box 154, all of which are supported on a common platform 156 which is removably mountable on frame members 52, 54 and 62 of frame 10. A sprocket wheel 158 on gear box 154 is coupled with a sprocket wheel 160 on the reel and turbine unit by means of a sprocket chain 162 to enable rewind rotation of the reel. As shown schematically in FIGS. 7 and 8, frame 10 is adapted to support a pendant or cable storage reel 164 mounted on support structure 80 at rear end 14 of the frame. Moreover, when frame 10 is provided with a water turbine absorber unit mounted as shown in FIGS. 7 and 8, considerable space is available between the latter unit and the rear of the frame for supporting auxiliary equipment used in connection with aircraft arresting operations such as, for example, portable hydraulic power units 166 and a portable air compressor unit 168.

The vertical disposition of axis 148 provides for the lateral or width dimension of tape 146 to be vertical as it leaves reel 144 and, as shown in FIG. 8, tape reel 144 supports tape 146 at an elevation above that at which the tape issues from the frame for use. It will be appreciated therefore that the tape path must provide for transferring the tape from the upper to the lower level between reel 144 and the selected one of the tape issue passageways 136 and 138. It will be further appreciated that such changing of the level of the tape requires reorienting the lateral dimension of the tape from the vertical disposition at the reel to a horizontal disposition prior to guidance of the tape to the lower elevation, followed by reorientation of the lateral dimension of the tape from the horizontal back to the vertical disposition prior to issuance of the tape from the selected one of the issue passageways. Such changes in the tape orientation and transition to the lower level are accomplished by mounting sheave unit 92 in its vertical disposition on portion 28b of frame plate 28, whereby the sheaves of sheave unit 92 are longitudinally aligned with sheaves 86, 88 and 122. More particularly, sheave 96 of sheave unit 92 is at the same upper vertical level as sheaves 86 and 88 which in turn are adjacent and at the same vertical level as tape reel 144, and sheave 98 of sheave unit 92 is at the same lower level as sheave 122 and the other sheaves of the front sheave assembly. The vertical mounting of sheave unit 92 provides for the axes of sheaves 96 and 98 to be horizontal and transverse to the opposite ends of frame 10, whereby it will be appreciated that the tape path for tape 146 is defined, in sequence from reel 144, by sheaves 88, 86, 96, 98 and 122 and thence, in accordance with the selected tape issue path, by sheaves 124 and 126 or by sheaves 128 and 130, the latter being shown as the selected tape issue path in FIGS. 7 and 8 to provide for free end 146a of the tape to be accessible for connection to a cable or net strap. It will be appreciated that sheaves 96 and 98 provide for transistion of the tape from the upper to the lower level, and that the longitudinal distance between sheaves 86 and 96 and between sheaves 98 and 122 provides for reorientations of the lateral dimension of the tape from vertical to horizontal and back to vertical to take place over a considerable distance, thus avoiding undesirable dynamics during an arresting operation.

It will be appreciated from the foregoing description of the structure of frame 10 and from the illustrations in FIGS. 7 and 8 that the tape path for tape 146 from reel 144 to the selected one of the two optional tape issue passageways includes a first leg extending from reel 144 about sheaves 88 and 86 and through tape slot 91 and tape path housing 118 to rear end 14 of the frame and through tape slot 112 to sheave unit 92, a second leg extending downwardly about sheaves 96 and 98, and a third leg extending forwardly from sheave 98 through tape slot 114 and tape passageway 66 to front end 12 of the frame and through tape slot 27 into the front sheave unit. Thereafter, the tape path is selectively through one of the tape issue passageways 136 and 138.

Figure 9:
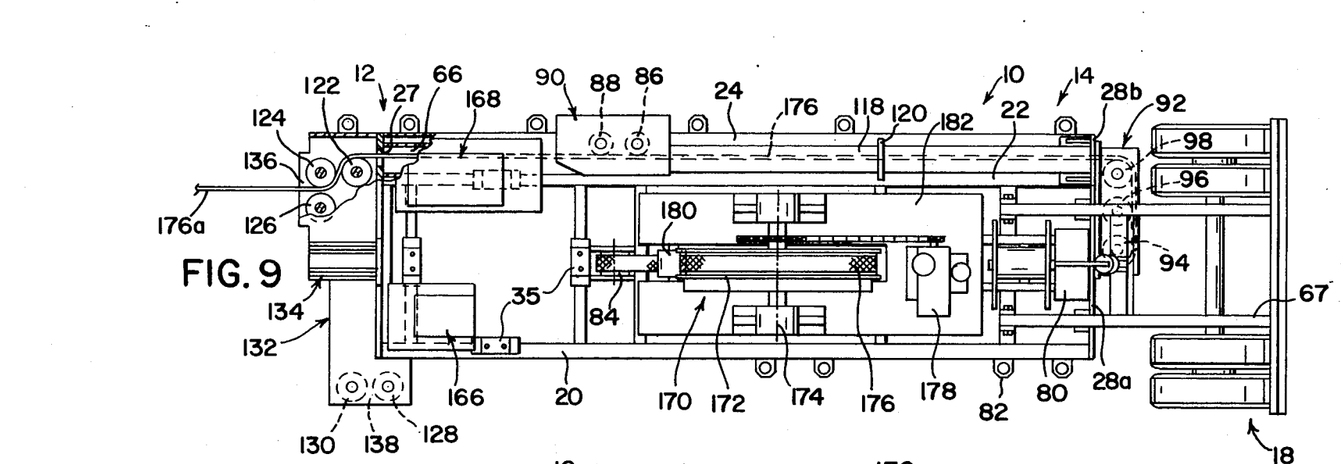
Figure 10:
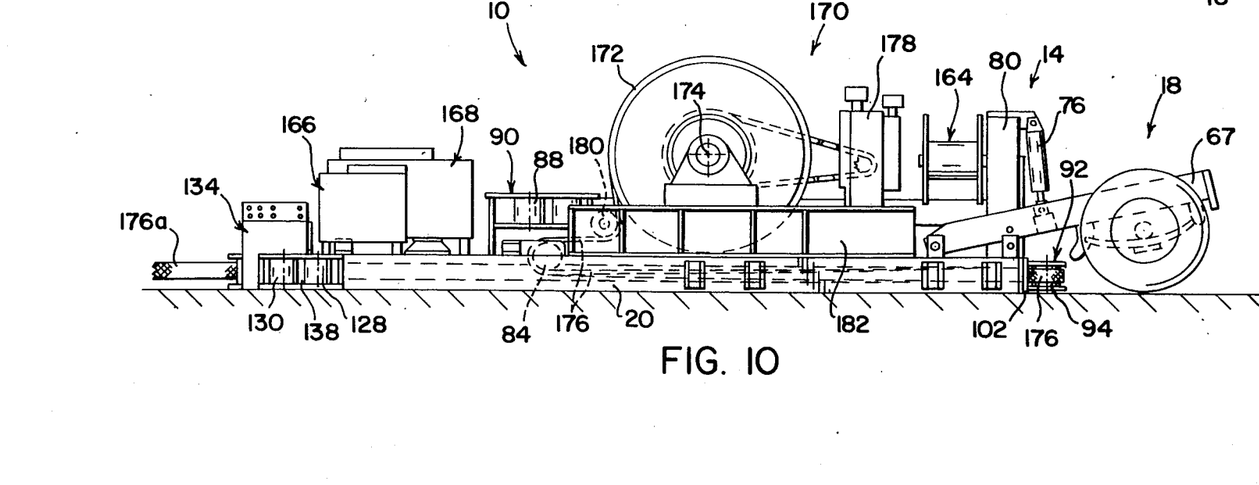

As will be appreciated from FIGS. 9 and 10 and the following description with respect thereto, frame 10 is adapted to accommodate a rotary friction absorber unit 170 comprised of a tape reel 172 rotatable about an axis 174 which is horizontal and transverse to the opposite ends of frame 10. Tape 176 is wound on reel 172 and is unwound therefrom during an arresting operation. Again, the structure and operation of such a rotary friction absorber is well known and does not form part of the present invention, whereby a detailed description thereof is not necessary. It is sufficient for purposes of the present disclosure to understand that reel 172 and such other equipment used in connection with the operation thereof including a rewind engine 178 and a tape lead-off sheave 180 are mounted on a common support platform 182 which facilitates the selective and removable mounting of the energy absorber unit on frame 10 by bolting the platform to underlying frame components. With friction absorber unit 170 mounted as shown, it will be appreciated that the area on frame 10 forwardly thereof can accommodate the portable hydraulic power units 166, only one of which is shown, and the portable air compressor unit 168 referred to hereinabove in connection with the description of FIGS. 7 and 8.

The only modification of frame 10 required to provide for the apparatus to be operable with friction absorber unit 170 is to mount sheave unit 92 on portion 28a of frame plate 28, whereby the sheaves 94, 96 and 98 are oriented as indicated in FIGS. 9 and 10 and are at the same level as the sets of sheaves providing the tape issue passageways at the front end of frame 10. The tape path for tape 176 in connection with friction absorber unit 170 is defined, in sequence from reel 172, by sheaves 180, 184 94, 98 and 122 and thence in accordance with the selected tape issue path, by sheaves 124 and 126 as shown in FIGS. 9 and 10, or by sheaves 128 and 130. Free end 176a of the tape extends through the selected tape issue passageway for connection to a cable or net strap. The horizontal orientation of reel axis 174 provides for the lateral or width dimension of tape 176 to be horizontal as it leaves reel 172, whereby it will be appreciated that the lateral dimension of the tape must be reoriented from the horizontal to a vertical disposition between sheave 84 and sheave 94. Sheave 84 is mounted on frame 10 at about the same longitudinal location as upper sheaves 86 and 88 relative to rear end 14 of the frame, whereby considerable distance is provided for reorientation of the tape to take place between sheaves 84 and 94 without any undesirable dynamics during playing of the tape from reel 172.

From the foregoing description of the frame structure and the illustrations in FIGS. 9 and 10 of the drawing, it will be appreciated that the tape path for tape 176 between reel 172 and the selected one of the optional tape issue passageways from the frame includes a first leg extending from reel 172 about sheaves 180 and 84 and thence rearwardly through tape slot 34a and tape passageway 65 and through tape slot 110 to sheave unit 92, a second leg extending laterally outwardly of the frame between sheaves 94 and 98, and a third leg extending forwardly through tape slot 114 and tape passageway 66 to front end 12 of the frame and through tape slot 27 into the front sheave unit. Thereafter the tape path is selectively through one of the tape issue passageways 136 and 138.

With further regard to FIGS. 7-10, it will be appreciated that tape issue passageway 138 will be used for the arresting tape when frame 10 of the apparatus is positioned along the side of a runway or air strip and parallel thereto with respect to the direction of landing aircraft, and that tape issue passageway 136 is used when the frame is positioned perpendicular to the direction of landing. The removal of goose neck 16 from the frame, as shown in FIGS. 9 and 10, facilitates positioning the front end of the apparatus adjacent the side of the runway without any obstruction or projection of the apparatus laterally inwardly of the runway.

While considerable emphasis has been placed herein on the preferred structure, it will be appreciated that many embodiments of the invention can be made and that changes can be made in the embodiment disclosed without departing from the principles of the invention. For example, while it is preferred to provide a selectively mountable rear sheave unit, it will be appreciated that the functions of the sheaves thereof can be provided through separate individually mountable sheaves or pairs of sheaves, and that tape path configurations between the tape reels and tape issue passageway or passageways can be devised which would be different from the preferred tape paths disclosed herein. These and other changes will be obvious and suggested to those skilled in the art upon reading the foregoing description of the preferred embodiment, whereby it is to be distinctly understood that the descriptive matter herein is to be interpreted merely as illustrative of the invention and not as a limitation.

Having thus described the invention, it is claimed:

1. Portable aircraft arresting apparatus comprising: transportable frame means having longitudinally opposite ends and laterally opposite sides, said frame means including means for the selective independent mounting of one of first and second energy absorbing means thereon, said first and second energy absorbing means respectively including first and second reel means, said first reel means when mounted on said frame means supporting first tape means and being rotatable about a first axis for said first tape means to extend from said first reel means longitudinally of said frame means, said second reel means when mounted on said frame means supporting second tape means and being rotatable about a second axis perpendicular to said first axis for said second tape means to extend from said second reel means laterally of said frame means, and said frame means including tape issue passageway means at one of said opposite ends and first and second guide means for respectively guiding said first and second tape means between the corresponding reel means and said tape issue passageway means, said first guide means guiding said first tape means along a first tape path extending from said first reel means to the other of said opposite ends of said frame means generally centrally of said frame means and then toward said one end, and said second guide means guiding said second tape means along a second tape path extending from said second reel means laterally to one of said laterally opposite sides of said frame means and along said one side to said other end of said frame means and then toward said one end.

2. Apparatus according to claim 1, wherein said first axis is horizontal and said second axis is vertical.

3. Apparatus according to claim 1, wherein said first tape path includes a first leg extending from said first reel means to said other end of said frame means generally centrally between said opposite sides thereof, a second leg of said other end of said frame means extending laterally toward said one of said opposite sides of said frame means, and a third leg extending along said one side toward said one end of said frame means.

4. Apparatus according to claim 1, wherein said second tape path includes a first leg extending laterally from said second reel means to said one of said opposite sides and then to said other end of said frame means along said one of said opposite sides, a second leg extending vertically at said other end of said frame means, and a third leg extending along said one side toward said one end of said frame means.

5. Apparatus according to claim 1, wherein said first tape path includes a first leg extending to said other of said frame means generally centrally between said opposite sides thereof, a second leg extending laterally toward said one of said opposite sides, and a third leg extending longitudinally from said second leg along said one side toward said one end of said frame means, and wherein said second tape path includes a first leg extending from said second reel means to said one of said opposite sides of said frame means and then to said other end along said one of said opposite sides, a second leg extending vertically at said other end of said frame means, and a third leg extending from said second leg along said one side toward said one end.

6. Apparatus according to claim 5, wherein said first axis is horizontal and transverse to said opposite sides and said second axis is vertical and generally centrally between said opposite sides.

7. Portable aircraft arresting apparatus comprising: transportable frame means having longitudinally opposite ends and laterally opposite sides, said frame means including means for the selective mounting of one of first and second energy absorbing means thereon respectively including first and second reel means, said first reel means supporting first tape means and being rotatable about a first axis, said first tape means extending from said first reel means longitudinally of said frame means, said second reel means supporting second tape means and being rotatable about a second axis perpendicular to said first axis, said second tape means extending from said second reel means laterally of said frame means, said frame means including tape issue passageway means and first and second guide means for respectively guiding said first and second tape means between the corresponding reel means and said tape issue passageway means, said frame means having longitudinally opposite ends and laterally opposite sides, and said tape issue passageway means including one passageway opening longitudinally of said frame means and another passageway opening laterally of said frame means.

8. Apparatus according to claim 7, wherein each said one and another passageway is selectable as a tape issue passageway for each said first and second tape means.

9. Apparatus according to claim 7, wherein said one and another passageway are at a common one of said opposite ends of said frame means.

10. Apparatus according to claim 9, wherein said one and another passageway are adjacent said laterally opposite sides of said frame means at said common end.

11. Apparatus according to claim 10, wherein each said one and another passageway is selectable as a tape issue passageway for each said first and second tape means.

12. Portable aircraft arresting apparatus comprising: transportable frame means having longitudinally opposite ends and laterally opposite sides, said frame means including means for selective mounting of one of first and second energy absorbing means thereon respectively including first and second reel means, said first reel means supporting first tape means and being rotatable about a first axis, said first tape means extending from said first reel means longitudinally of said frame means, said second reel means supporting second tape means and being rotatable about a second axis perpendicular to said first axis, said second tape means extending from said second reel means laterally of said frame means, said frame means including tape issue passageway means and first and second guide means for respectively guiding said first and second tape means between the corresponding reel means and said tape issue passageway means, said tape issue passageway means being adjacent one of said opposite ends, said first and second guide means for guiding said first and second tape means including means resepectively guiding said first and second tape means along first and second tape paths extending from the corresponding reel means to the other of said opposite ends of said frame means and then toward said one end, said tape issue passageway means including one passageway opening longitudinally of said frame means at said one of said opposite ends and another passageway opening laterally of said frame means at said one end.

13. Apparatus according to claim 12, wherein each said one and another passageway is selectable as a tape issue passageway for said first tape means.

14. Apparatus according to claim 13, wherein said one and another passageway are adjacent said laterally opposite sides of said frame means at said one end.

15. Portable aircraft arresting apparatus comprising: transportable frame means having longitudinally opposite ends and laterally opposite sides, said frame means including means for the selective mounting of one of first and second energy absorbing means thereon respectively including first and second reel means, said first reel means supporting first tape means and being rotatable about a first axis, said first tape means extending from said first reel means longitudinally of said frame means, said second reel means supporting second tape means and being rotatable about a second axis perpendicular to said first axis, said second tape means extending from said second reel means laterally of said frame means, said frame means including tape issue passageway means and first and second guide means for respectively guiding said first and second tape means between the corresponding reel means and said tape issue passageway means, said tape issue passageway means being adjacent one of said opposite ends, said first and second guide means for guiding said first and second tape means including means respectively guiding said first and second tape means along first and second tape paths extending from the corresponding reel means to the other of said opposite ends of said frame means and then toward said one end, said second tape path including a first leg extending to said other end along one of said opposite sides, a second leg extending vertically at said other end, and a third leg extending along said one side toward said one end, and said tape issue passageway means including one passageway opening longitudinally of said frame means at said one of said opposite ends and another passageway opening laterally of said frame means at said one end.

16. Apparatus according to claim 15, wherein each said one and another passageway is selectable as a tape issue passageway for said second tape means.

17. Apparatus according to claim 16, wherein said one and another passageway are adjacent said laterally opposite sides of said frame means at said one end.

18. Portable aircraft arresting apparatus comprising: transportable frame means having longitudinally opposite ends and laterally opposite sides, said frame means including means for the selective mounting of one of first and second energy absorbing means thereon respectively including first and second reel means, said first reel means supporting first tape means and being rotatable about a first axis, said first tape means extending from said first reel means longitudinally of said frame means, said second reel means supporting second tape means and being rotatable about a second axis perpendicular to said first axis, said second tape means extending from said second reel means laterally of said frame means, said frame means including tape issue passageway means and first and second guide means for respectively guiding said first and second tape means between the corresponding reel means and said tape issue passageway means, said tape issue passageway means being adjacent one of said opposite ends, said first and second guide means for guiding said first and second tape means including means respectively guiding said first and second tape means along first and second tape paths extending from the corresponding reel means to the other of said opposite ends of said frame means and then toward said one end, said first tape path including a first leg extending to said other end of said frame means generally centrally between said opposite sides thereof, a second leg extending laterally in the direction between said opposite sides, and a third leg extending longitudinally from said second leg toward said one of said frame means, said second tape path including a first leg extending to said other end along one of said opposite sides, a second leg extending vertically at said other end, and a third leg extending along said one side toward said one end, and said tape issue passageway means including one passageway opening longitudinally of said frame means at said one of said opposite ends and another passageway opening laterally of said frame means at said one end.

19. Apparatus according to claim 18, wherein each said one and another passageway is selectable as a tape issue passageway for each said first and second tape means.

20. Apparatus according to claim 19, wherein said one and another passageway are adjacent said laterally opposite sides of said frame means at said one end.

21. Apparatus according to claim 20, wherein said first axis is horizontal and transverse to said opposite sides and said second axis is vertical and generally centrally between said opposite sides.

22. Apparatus according to claim 21, wherein said third leg of said first tape path extends along said one side of said frame means.

23. Portable aircraft arresting apparatus comprising transportable frame means having longitudinally opposite ends and laterally opposite sides, energy absorbing means on said frame means including reel means and corresponding tape means, means on said frame means providing selectable first and second tape issue passageway means, said first passageway means opening longitudinally of said frame means and said second passageway means opening laterally of said frame means, and guide means on said frame means providing a tape path for said tape means between said reel means and each said first and second tape issue passageway means.

24. Apparatus according to claim 23, wherein said first and second tape issue passageway means are at a common one of said opposite ends of said frame means.

25. Apparatus according to claim 23, wherein said first tape issue passageway means is adjacent one of the laterally opposite sides of said frame means and said second tape issue passageway means opens through the other of said opposite sides.

26. Apparatus according to claim 25, wherein said first and second tape issue passageway means are at a common one of said opposite ends of said frame means.

* * * * *